United States Patent [19]

Boutin

[11] 3,934,807
[45] Jan. 27, 1976

[54] MIRROR JOINT ASSEMBLY
[75] Inventor: Harold S. Boutin, Northwood, Ohio
[73] Assignee: The Acme Specialty Manufacturing Company, Toledo, Ohio
[22] Filed: Oct. 1, 1973
[21] Appl. No.: 402,466

[52] U.S. Cl. .............................................. 248/478
[51] Int. Cl.² .......................................... A47G 1/24
[58] Field of Search.......... 248/290, 475 B, 478, 479

[56] References Cited
UNITED STATES PATENTS

| | | | |
|---|---|---|---|
| 2,807,985 | 10/1957 | Beach | 248/279 X |
| 3,119,591 | 1/1964 | Malecki | 248/282 |
| 3,322,388 | 5/1967 | Budreck | 248/475 B |
| 3,384,334 | 5/1968 | Malachowski | 248/478 |
| 3,730,474 | 5/1973 | Bowers | 248/478 |
| 3,784,149 | 1/1974 | Brudy | 248/478 |

Primary Examiner—William H. Schultz
Attorney, Agent, or Firm—Richard D. Emch, Esq.

[57] ABSTRACT

The invention relates to a mirror joint assembly. A cover member has opposed detents on its inner surface which mate with complementary recesses on an adjacent clutch member. Threaded studs extend outwardly from the cover member and the clutch member for attaching the joint assembly to supports which are parts of an overall mirror assembly. A spring biases the clutch member and the cover member into an engaged position to retard relative rotation between the clutch member and the cover member.

6 Claims, 7 Drawing Figures

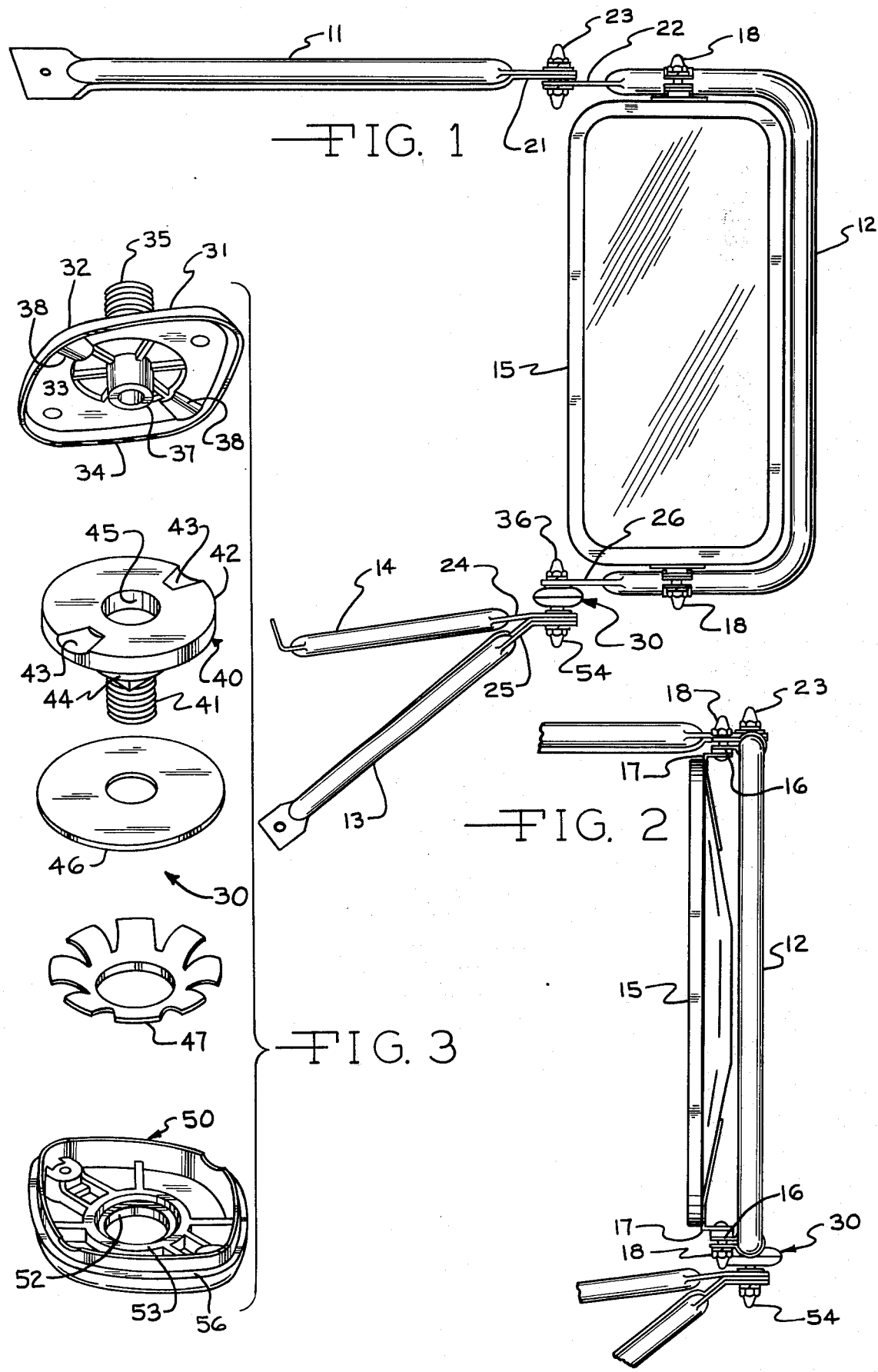

MIRROR JOINT ASSEMBLY

BACKGROUND OF THE INVENTION

Mirror assemblies are known for use with many different types of vehicles. The mirror assembly, according to the present invention, is specifically adapted for use in connection with, for examples, trucks, the tractors or tractor-trailer combinations, trailer campers and recreational vehicles.

This type of mirror assembly must have the ability to be set in a fixed position for normal road use and be adjustable relative to a vertical axis for other driving situations, for example, where a driver is backing into a loading dock. In addition, the mirror assembly must have some resiliency if it is struck by an obstacle or if the vehicle to which it is attached is passing through an automatic washer. Many types of prior art mirror assemblies are known, for examples, the types shown in U.S. Pat. Nos. 2,969,715, 3,119,591 and 3,322,388.

SUMMARY OF THE INVENTION

The present invention relates to a mirror joint assembly which has a set position for use during normal driving and is readily adjustable for other driving situations.

The mirror joint assembly, according to the present invention, includes a cover member having an outer surface and an inner surface. In one embodiment, a threaded stud extends outwardly from the outer surface of the cover member and a pair of diametrically opposed detents are defined on the inner surface. A clutch member is positioned adjacent the inner surface of the cover member and includes a pair of complementary recesses adjacent the detents. A threaded stud extends axially outwardly from the clutch member and spring means are provided to urge the clutch member and the cover member into an engaged relationship wherein the detents are received by the recesses.

When the mirror is in the driving position, the detents are engaged in the recesses and the spring means urges the members into this relationship. To move a mirror around a vertical axis out of the engaged relationship, the operator must overcome the spring force and move the detents out of the recesses. Even though the detents are moved out of the recesses, the mirror tends to stay in a set position once it is placed in that position. When the operator again desires to place the mirror in the driving position, he merely rotates the mirror until the engaging relationship is reached between the detents and the recesses.

BRIEF DESCRIPTION OF THE DRAWINGS

FIG. 1 is an elevational view of a truck mirror assembly including a mirror joint assembly according to the present invention;

FIG. 2 is a fragmentary, elevational view, showing the bow arm portion of the mirror assembly rotated 90° from the position shown in FIG. 1;

FIG. 3 is an exploded view of one embodiment of a mirror joint assembly, according to the present invention;

DESCRIPTION OF THE PREFERRED EMBODIMENTS

Figure 5:
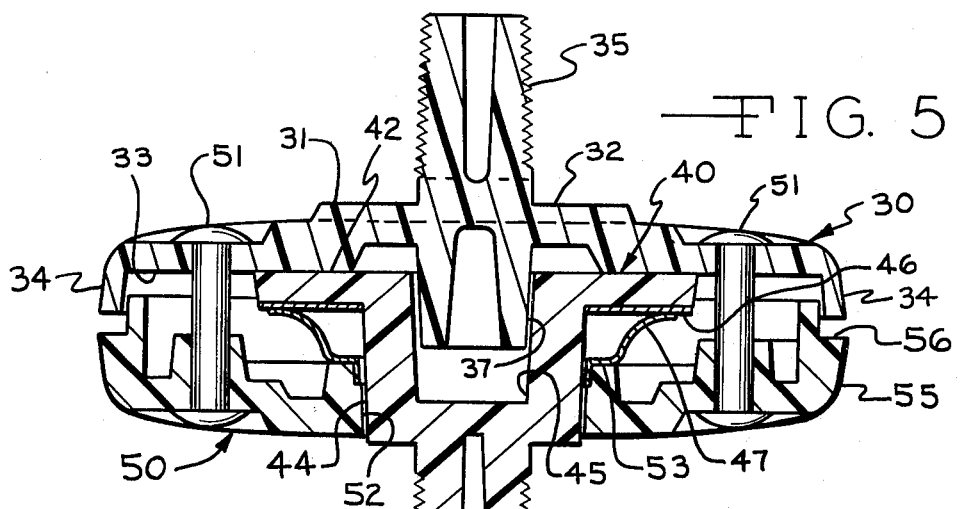
FIG. 5 is an enlarged vertical sectional view, taken along the line 5—5 of FIG. 4.

A mirror assembly is generally indicated by the reference number 10 in FIG. 1. The mirror assembly 10 includes an upper support arm 11, a U-shaped bow arm 12, a lower support arm 13, a brace arm 14, and a mirror 15. Clips 16 (see FIG. 2) are attached to the bow arm 12 and are aligned with brackets 17 on the back of the mirror 15. Bolt assemblies 18 connect the clips 16 to the respective brackets 17 and the mirror 15 is held in a fixed position relative to the bow arm 12 unless the bolt assemblies 18 are released and the mirror 15 adjusted. After the correct adjustment is reached, the bolt assemblies 18 are tightened.

Similarly, the upper support arm 11 has an end 21 which is aligned with an end 22 of the bow arm 12. A bolt assembly 23 connects the ends 21 and 22 together in a manner such that the upper support 11 and bow arm 12 may be pivoted relative to each other around the vertical axis defined by the bolt assembly 23.

The brace arm 14 has an end 24 which is vertically aligned with an end 25 of the lower support arm 13 and an end 26 of the U-shaped bow arm 12. A mirror joint assembly according to the present invention is generally indicated by the reference number 30. The mirror joint assembly 30, in operation, is disposed between the end 26 of the bow arm 12 and the adjacent ends 24 and 25 of the base arm 14 and the lower support arm 13. Referring to FIG. 3, in the present embodiment, the mirror joint assembly 30 includes a generally elliptical-shaped cover member 31 which has an upper surface 32, a lower surface 33 and a depending sidewall 34. A threaded stud 35 extends outwardly from the upper surface 32 and is attached to the end 26 of the bow arm 12 by an acorn nut 36.

A hub 37 extends outwardly from the lower surface 33 of the cover member 31 in an opposed relationship to the threaded stud 35. A pair of diametrically opposed projections or detents 38 are defined on the lower surface 33 of the cover member 31 adjacent the sidewall 34.

The mirror joint assembly 30 also includes a clutch member 40 having a threaded stud 41 extending outwardly therefrom. The clutch member 40 includes a circular plate 42 which defines recesses 43 adjacent its periphery. The recesses 43 are in a complementary mating relationship with the detents 38 of the cover member 31. The detents 38 and the recesses 43 serve as cooperating elements to retard relative rotation between the clutch member 40 and the cover member 31. The clutch member 40 has a central body portion 44 which defines a central cup-shaped recess 45. The recess 45 receives the hub 37, as shown in FIG. 5.

In the present embodiment, a washer 46 is received by the threaded stud 41 and is positioned closely adjacent the underside of the circular plate 42. A disk spring 47 surrounds the body portion 44 and acts as load bearing surface or reaction surface for the spring 47.

A second or bottom cover member 50 is attached to the top cover member 31 by a pair of rivets 51. The bottom cover 50 includes a circular opening 52 which receives the body portion 44 of the clutch member 40.

The body cover 50 also includes a circular land 53 which mounts the spring 47.

Figure 6:
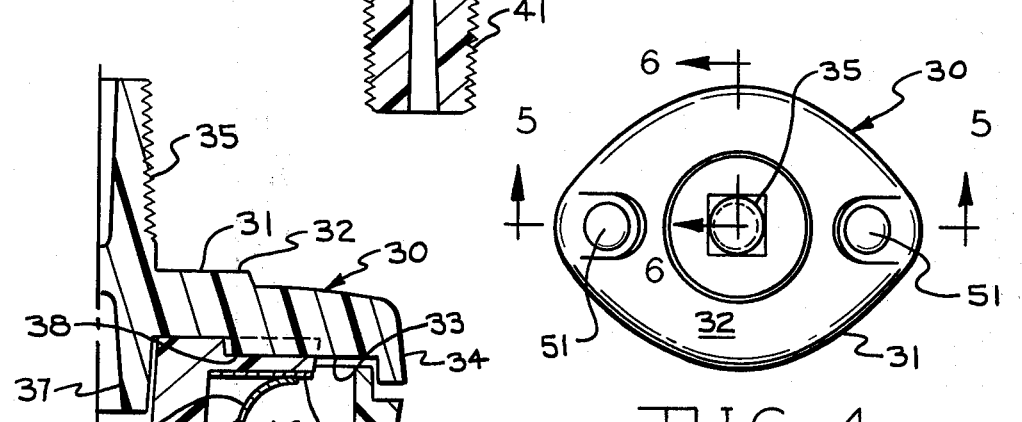
FIG. 6 is a fragmentary, vertical sectional view, taken along the line 6—6 of FIG. 4.
Figure 4:
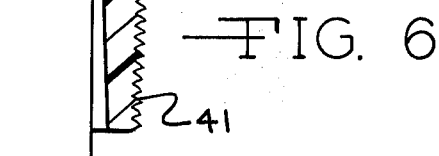
FIG. 4 is a top view of the mirror joint assembly, according to the present invention.

The threaded stud 41 extends through holes in the ends 24 and 25 of the brace arm 14 and lower support arm 13, respectively, and is secured thereto by an acorn nut 54. When the mirror assembly 10 is in its normal position, shown in FIG. 1, the mirror joint assembly 30 is in its set or locked position, best illustrated in FIG. 6. The clutch member 40 is urged by the spring 47 toward the cover member 31 and the detents 38 are mated in the recesses 43. When in this position, the mirror 15 can only be rotated around a vertical axis if the spring force, generated by the spring 47, is overcome and the detents 38 moved out of their complementary mating recesses 43. It should be noted that the cooperating elements, namely the detents 38 and the recesses 43, may be reversed from the position shown in their preferred embodiment. In other words, the recesses 43 may be defined by the cover member 31 (not shown) and the detents defined on the clutch member 40 (not shown).

Even when the mirror 15 is rotated out of the locked position shown in FIG. 1, the spring 47 generates enough force to keep a relatively tight friction fit between the clutch member 40 and the cover member 31 such that the mirror 15 will normally stay in any preset vertical plane. When the operator again desires to move the mirror 15 to the set or locked position shown in FIG. 1, he merely rotates the mirror until the cooperating elements, namely the detents 38 and the recesses 43, are in their mating or engaged relationship.

The bottom cover 50 includes an upstanding sidewall 55, having an L-shaped surface 56. When the bottom cover 50 is mounted on the cover member 31, as shown in FIG. 5, the L-shaped upper surface 56 receives the sidewall 34 of the cover member 31, in a telecoping relationship.

Figure 7:
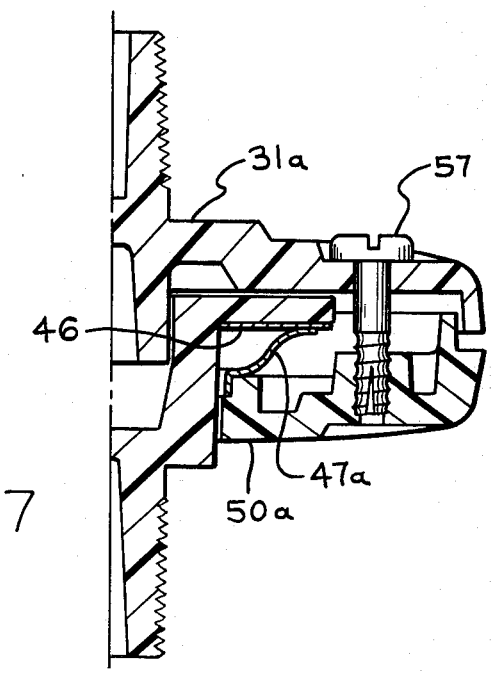
FIG. 7 is a fragmentary sectional view of another embodiment of a mirror joint assembly, according to the present invention.

FIG. 7 shows another embodiment of the present invention. In this embodiment, a cover member 31a is connected to a bottom cover member 50a by a pair of adjustable screws 57. Rotation of the screws 57 adjusts the vertical relationship between the two components and at the same time adjusts the spring tension on a spring 47a.

It has been found that a mirror joint assembly, according to the present invention, provides a quick and easy structure for use in a mirror assembly. The mirror assemblies can be used with, for examples, trucks, the tractors of tractor-trailer combinations, trailer campers and recreational vehicles. The mirror assemblies can also be folded inwardly when passing through an automatic washer or if the vehicle, such as a car, is no longer connected to its camper trailer.

What I claim is:

1. A mirror joint assembly comprising, in combination, a cover member defining first cooperating members on its inner surface, a clutch member adjacent said cover member, said clutch member including second cooperating members complementary with said first cooperating members, attaching means operatively connected to said cover member for attaching said cover member to a support, connecting means operatively attached to said clutch member for connecting said clutch member to a support, a bottom member adjacent said clutch member and separate from said cover member, said cover member and said bottom member having complementary sidewalls with mating surfaces, spring means positioned between said bottom member and said clutch member for urging said first and second cooperating members into an engaging relationship, means for variably adjusting the spring force of said spring means, whereby said mating surfaces of said complementary sidewalls of said cover member and said bottom member are moved relative to one another, said variable adjusting means comprising at least two adjusting screws extending between said cover member and said bottom member.

2. Apparatus according to claim 1, including a hub extending from such inner surface of said cover member, said first cooperating means comprising a pair of projections on such inner surface, said clutch member including a circular plate member which defines a hole to receive said hub, said second cooperating means comprising recesses defined adjacent the periphery of said circular plate.

3. Apparatus according to claim 1, wherein said attachment means operatively connected to said cover member comprises an outwardly extending threaded stud.

4. Apparatus according to claim 1, wherein said spring means comprises a disk spring.

5. Apparatus according to claim 1, wherein said first cooperating members comprise a pair of projections and said second cooperating members comprise a pair of recesses.

6. Apparatus according to claim 1, wherein said connecting means operatively attached to said clutch member comprises an outwardly extending threaded stud.

* * * * *